(12) United States Patent
Shinoda et al.

(10) Patent No.: US 7,782,730 B2
(45) Date of Patent: Aug. 24, 2010

(54) OPTICAL-PICKUP-ADJUSTMENT OPTICAL DISK, METHOD OF ADJUSTING OPTICAL PICKUP DEVICE, AND METHOD OF PRODUCING OPTICAL PICKUP DEVICE

(75) Inventors: Masahisa Shinoda, Tokyo (JP); Daisuke Matsubara, Tokyo (JP); Kenya Nakai, Tokyo (JP); Hironori Nakahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 426 days.

(21) Appl. No.: 12/071,131

(22) Filed: Feb. 15, 2008

(65) Prior Publication Data
US 2008/0205235 A1 Aug. 28, 2008

(30) Foreign Application Priority Data
Feb. 26, 2007 (JP) ............................. 2007-044918

(51) Int. Cl.
*G11B 7/26* (2006.01)
*G11B 7/20* (2006.01)

(52) U.S. Cl. ........................................ 369/94; 369/283

(58) Field of Classification Search ............... 369/94, 369/283, 275.1, 275.3, 275.4, 53.18, 288, 369/280, 286, 112.24
See application file for complete search history.

(56) References Cited

U.S. PATENT DOCUMENTS

2008/0186836 A1* 8/2008 Tanaka et al. ........... 369/112.24

FOREIGN PATENT DOCUMENTS

| JP | 2001-43574 A | 2/2001 |
| JP | 2002-100061 A | 4/2002 |
| JP | 2004-39171 A | 2/2004 |
| JP | 2004-185758 A | 7/2004 |
| JP | 2005-327395 A | 11/2005 |

* cited by examiner

*Primary Examiner*—Ali Neyzari
(74) *Attorney, Agent, or Firm*—Birch, Stewart, Kolasch & Birch, LLP

(57) ABSTRACT

An optical-pickup-adjustment optical disk used for adjusting or producing an optical pickup device, includes a transparent protective substrate; and an optical-pickup-adjustment middle-depth information recording layer formed on a side of an inside surface of the transparent protective substrate, wherein the optical-pickup-adjustment middle-depth information recording layer is formed to have a middle depth which is a center of the maximum depth of the maximum-depth information recording layer prescribed by the optical disk standard and the minimum depth of the minimum-depth information recording layer prescribed by the optical disk standard.

10 Claims, 9 Drawing Sheets

FE = (A + C) − (B + D)

FE = (A + C) − (B + D)

OPTICAL-PICKUP-ADJUSTMENT OPTICAL DISK, METHOD OF ADJUSTING OPTICAL PICKUP DEVICE, AND METHOD OF PRODUCING OPTICAL PICKUP DEVICE

BACKGROUND OF THE INVENTION

1. Field of the Invention

The present invention relates to an optical-pickup-adjustment optical disk used when an optical pickup device of an optical disk apparatus is adjusted, a method of adjusting an optical pickup device using the optical-pickup-adjustment optical disk, and a method of producing an optical pickup device using the method of adjusting an optical pickup device.

2. Description of the Related Art

A compact disc (CD), in or from which information is recorded or reproduced using a red laser beam having a center wavelength of 0.78 µm, and a digital versatile disc (DVD), in or from which information is recorded or reproduced using a red laser beam having a center wavelength of 0.65 µm, are put into practical use as optical disks. Further, a "blue laser optical disk" such as a High-Definition DVD (HD-DVD) and a Blu-ray disc, in or from which information is recorded or reproduced using a blue laser beam having a center wavelength of 0.405 µm, is started to be in a practical use.

Further, a multilayered optical disk including a plurality of information recording layers is standardized in the DVD standard or the Blu-ray disc standard in order to implement higher density recording. In general, since an optical disk includes a transparent protective substrate on a side of laser beam incidence, the protective substrate of a multilayer optical disk has different thicknesses in a region of a shallow information recording layer which is near the surface of the protective substrate and another region of a deep information recording layer which is far from the surface of the protective substrate. For example, the Blu-ray disc standard prescribes that a distance between a shallow layer near the surface and a deep layer far from the surface is 25 µm, a thickness of the protective substrate in a region of the shallow layer is 75 µm (an average value), and a thickness of the protective substrate in a region of the deep layer is 100 µm (an average value).

When a laser beam converged by a lens enters the protective substrate, spherical aberration occurs in accordance with a thickness of the protective substrate. Since the spherical aberration sometimes causes a trouble in recording or reproducing a signal in or from an optical disk, an optical system including a lens and a light detector is designed in such a way that the spherical aberration of an optical pickup device becomes the smallest.

As has been described, since the spherical aberration depends on a thickness of the protective substrate, an optical pickup device compatible with a multilayer optical disk needs to have a function of adjusting the spherical aberration by itself. For example, there is a proposal of an optical pickup device that can adjust the spherical aberration by moving a collimator lens along an optical axis for converting a laser beam ejected from a semiconductor laser to a substantially parallel light beam (e.g., see Patent Document 1).

Patent Document 1 is Japanese Patent Application Kokai (Laid-Open) Publication No. 2005-327395 (page 7, FIG. 2).

In the optical pickup device disclosed in Patent Document 1, it is required that a collimator lens be moved only in a direction of an optical axis in an ideal case. However, a movement mechanism of a practical collimator lens normally has "play" and "looseness", and also has an arrangement error in component members of the movement mechanism. Therefore, when a collimator lens is moved by the movement mechanism in a direction of the optical axis, a little displacement of the collimator lens occurs in a different direction from a direction of an optical axis. When the undesired displacement of the collimator lens occurs in the different direction from the desired direction of the optical axis, a positional relationship between a laser beam reflected from an optical disk and a light detector receiving the reflected laser beam to detect it, deviates from a desired positional relationship. As a result, the conventional optical pickup device has a problem that a detection signal output from the light detector varies due to the movement of the collimator lens.

SUMMARY OF THE INVENTION

An object of the present invention is to provide an optical-pickup-adjustment optical disk that makes it possible to adopt an adjustment method, which can suppress an influence of the displacement of the collimator lens in the different direction from the direction of the optical axis on the detection signal of the light detector within a permissible range.

Further, another object of the present invention is to provide a method of adjusting an optical pickup device, which can suppress an influence of the displacement of the collimator lens in the different direction from the direction of the optical axis on the detection signal of the light detector within a permissible range, and a method of producing an optical pickup device using the method of adjusting an optical pickup device.

According to an aspect of the present invention, an optical-pickup-adjustment optical disk is used for adjusting an optical pickup device, wherein the optical pickup device irradiates an optical disk comprising a plurality of information recording layers formed on a side of an inside surface of a transparent protective substrate with a laser beam, thereby applying the laser beam through the transparent protective substrate to any of the plurality of information recording layers to detect the laser beam reflected from the information recording layer, to which the laser beam is applied, and an optical disk, in or from which information is recorded or reproduced by the optical pickup device, is prescribed by an optical disk standard, which prescribes a maximum-depth information recording layer which is a layer having a maximum depth from an outer surface of the protective substrate, and a minimum-depth information recording layer which is a layer having a minimum depth, which is shallower than the maximum depth, from the outer surface of the protective substrate. The optical-pickup-adjustment optical disk includes a transparent protective substrate; and an optical-pickup-adjustment middle-depth information recording layer formed on a side of an inside surface of the transparent protective substrate, the optical-pickup-adjustment middle-depth information recording layer being formed to have a middle depth which is a center of the maximum depth of the maximum-depth information recording layer prescribed by the optical disk standard and the minimum depth of the minimum-depth information recording layer prescribed by the optical disk standard.

According to another aspect of the present invention, a method of adjusting an optical pickup device uses an adjustment device including a disk drive means for rotating an optical disk, and a light detector adjustment means for adjusting a position of a light detector of the optical pickup device on the basis of a detection signal output from the light detector, and the above-described optical-pickup-adjustment optical disk loaded on the adjustment device. The method includes the steps of: rotating the optical-pickup-adjustment optical disk, by the disk drive means of the adjustment device; irradiating the optical-pickup-adjustment middle-depth information recording layer of the optical-pickup-adjustment optical disk through the protective substrate with a laser beam, and detecting the laser beam reflected from the optical-pickup-adjustment middle-depth information recording layer; and adjusting the position of the light detector of the optical pickup device on the basis of the detection result of the reflected laser beam.

According to yet another aspect of the present invention, a method of adjusting an optical pickup device according to the present invention uses an adjustment device including a disk drive means for rotating an optical disk, a movement means for changing a relative position of the disk drive means to the optical disk, and a light detector adjustment means for adjusting a position of a light detector of the optical pickup device on the basis of a detection signal output from the light detector, and the above described optical-pickup-adjustment optical disk loaded on the adjustment device. The method includes the steps of: rotating the optical-pickup-adjustment optical disk, by the disk drive means of the adjustment device; changing the relative position between the optical pickup device and the optical-pickup-adjustment optical disk, by the movement means; irradiating the optical-pickup-adjustment middle-depth information recording layer of the optical-pickup-adjustment optical disk through the protective substrate with a laser beam, and detecting the laser beam reflected from the optical-pickup-adjustment middle-depth information recording layer; adjusting the position of the light detector of the optical pickup device on the basis of the detection result of the laser beam reflected from the optical-pickup-adjustment middle-depth information recording layer, by the light detector adjustment means of the adjustment device; changing a relative position between the optical pickup device and the optical-pickup-adjustment optical disk, by the movement means of the adjustment device, irradiating the optical-pickup-adjustment maximum-depth information recording layer of the optical-pickup-adjustment optical disk through the protective substrate with a laser beam, and detecting the laser beam reflected from the optical-pickup-adjustment maximum-depth information recording layer; changing a relative position between the optical pickup device and the optical-pickup-adjustment optical disk, by the movement means of the adjustment device, irradiating the optical-pickup-adjustment minimum-depth information recording layer of the optical-pickup-adjustment optical disk through the protective substrate with a laser beam, and detecting the laser beam reflected from the optical-pickup-adjustment minimum-depth information recording layer; and judging quality of a signal, by the adjustment device, on the basis of a detection result of the laser beam reflected from the optical-pickup-adjustment maximum-depth information recording layer and another detection result of the laser beam reflected from the optical-pickup-adjustment minimum-depth information recording layer.

Furthermore, according to yet another aspect of the present invention, a method of producing an optical pickup device according to the present invention uses the above described method of adjusting an optical pickup device.

By adjusting an optical pickup device using the optical-pickup-adjustment optical disk according to the present invention, an influence of the displacement of the collimator lens in the different direction from the direction of the optical axis on the detection signal of the light detector can be suppressed within a permissible range. Therefore, the present invention has an effect of improving detection accuracy of a signal recorded in an information recording layer.

Further, by using the method of adjusting an optical pickup device or the method of producing an optical pickup device according to the present invention, an influence of the displacement of the collimator lens in the different direction from the direction of the optical axis on the detection signal of the light detector can be suppressed within a permissible range. Therefore, the present invention has an effect of improving detection accuracy of a signal recorded in an information recording layer.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
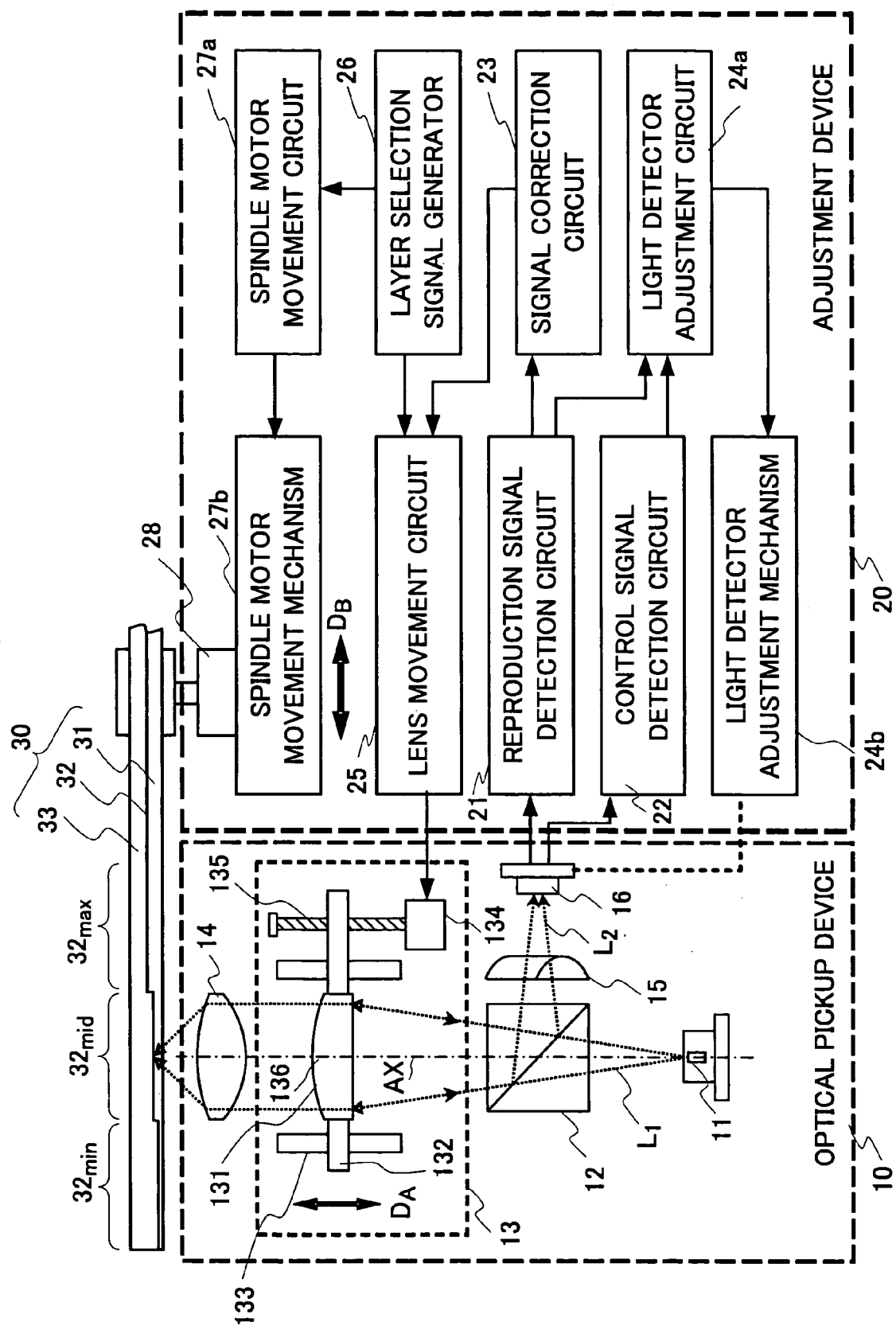
FIG. 1 is a diagram schematically showing a cross-sectional shape of an optical-pickup-adjustment optical disk according to the first embodiment of the present invention, a plan view of an optical pickup device, to which a method of adjusting an optical pickup device according to the first embodiment is applied, and structure of an adjustment device used for performing the method of adjusting an optical pickup device according to the first embodiment or the method of producing an optical pickup device using the method of adjusting an optical pickup device according to the first embodiment.

FIG. 1 is a diagram schematically showing a cross-sectional shape of an optical-pickup-adjustment optical disk 30 according to the first embodiment of the present invention, a plan shape of an optical pickup device 10 applied to an adjustment method according to the first embodiment, and structure of an adjustment device 20 used for performing a method of adjusting an optical pickup device according to the first embodiment.

As shown in FIG. 1, when a method of adjusting an optical pickup device or a method of producing an optical pickup device according to the first embodiment is executed, an optical pickup device is constructed or assembled as shown in FIG. 1 and then the constructed optical pickup device 10 is connected to an adjustment device 20, and an optical-pickup-adjustment optical disk 30 is loaded on a spindle motor 28 of the adjustment device 20. The optical pickup device 10 is in conformity with the multilayer optical disk standard. The optical pickup device 10 irradiates an optical disk including the multilayer information recording layers formed on a side of an inner surface of a transparent protective substrate with a laser beam advancing in the same direction through the protective substrate, and detects the laser beam reflected from any of the multilayer information recording layers. Further, the optical disk standard for an optical disk, in or from which a signal is recorded or reproduced by the optical pickup device 10, prescribes at least a maximum-depth information recording layer having a maximum depth, which is a distance from an outer surface of the protective substrate to the maximum-depth information recording layer, and a minimum-depth information recording layer having a minimum depth, which is a distance from an outer surface of the protective substrate to the minimum-depth information recording layer. There may be a case where the optical disk standard for an optical disk, in or from which a signal is recorded or reproduced by the optical pickup device 10, prescribes another information recording layer or layers in addition to the maximum-depth information recording layer and the minimum-depth information recording layer, that is, prescribes three or more information recording layers.

As shown in FIG. 1, the optical pickup device 10 includes a semiconductor laser 11 which emits a laser beam $L_1$, a beam splitter 12, a collimator lens optical system 13, an object lens 14, a cylindrical lens 15, and a light detector 16, as its main constituent elements. The collimator lens optical system 13 includes a collimator lens 131, a lens holder 132 which holds the collimator lens 131, guide shafts 133 which support the lens holder 132 so as to be able to be moved in a direction of an arrow $D_A$, a motor 134, and a screw shaft 135 which engages with a screw hole of the lens holder 132 and is coupled to a shaft of the motor 134. The lens holder 132, the guide shaft 133, the motor 134, and the screw shaft 135 form a collimator lens movement mechanism for causing the collimator lens 131 to move in a direction of an arrow $D_A$ substantially the same direction as a direction of the optical axis (hereinafter also referred to as "an optical axis of an object lens") AX of the optical system including the elements of the semiconductor laser 11 to the object lens 14. The screw shaft 135 is rotated by the motor 134, the lens holder 132 slides along the guide shaft 133 in a direction of an arrow $D_A$.

In the optical pickup device 10, a laser beam $L_1$ emitted from the semiconductor laser 11 passes through the beam splitter 12 to enter the collimator lens 131. A laser beam $L_1$ is converted into the approximately parallel light beam by the collimator lens 131 and enters the object lens 14 to be focused in the optical-pickup-adjustment optical disk 30. A laser beam $L_2$ reflected by the optical-pickup-adjustment optical disk 30 advances in a reverse direction, passes through the object lens 14 and the collimator lens 131, is reflected by the beam splitter 12, passes through the cylindrical lens 15, and then impinges on the light detector 16.

Further, as shown in FIG. 1, the adjustment device 20 includes a reproduction signal detection circuit 21 which detects a reproduction signal from a signal output from the light detector 16; a control signal detection circuit 22 which detects a control signal from a signal output from the light detector 16; a signal correction circuit 23 which receives a reproduction signal output from the reproduction signal detection circuit 21; a light detector adjustment circuit 24a which receives the reproduction signal output from the reproduction signal detection circuit 21 and a control signal output from the control signal detection circuit 22 and generates an adjustment signal; and a light detector adjustment mechanism 24b which receives the adjustment signal output from the light detector adjustment circuit 24a and includes, for example, a stepping motor and other components. The light detector adjustment mechanism 24b is connected to a position adjustment mechanism (shown by the broken line) associated with the light detector 16, and is adjusted in accordance with the adjustment signal output from the light detector adjustment circuit 24a to adjust a position of the light detector 16. Further, the adjustment device 20 includes a lens movement circuit 25 which receives a signal output from the signal correction circuit 23 and outputs a lens movement signal to the motor 134 of the optical pickup device 10; a layer selection signal generator 26; a spindle motor movement circuit 27a; a spindle motor movement mechanism 27b which operates on the basis of a signal output from the spindle motor movement circuit 27a; and a spindle motor 28 which rotates the optical disk put on the spindle motor movement mechanism 27b. The signal output from the lens movement circuit 25 is input to the motor 134 of the optical pickup device 10. The layer selection signal generator 26 outputs a signal relating to a selected layer of the optical-pickup-adjustment optical disk 30 generated by a system controller, not shown in the figure, to the lens movement circuit 25 and the spindle motor movement circuit 27a, for example. A signal output from the spindle motor movement circuit 27a is input to the spindle motor movement mechanism 27b, and the spindle motor movement mechanism 27b can move the spindle motor 28 in a direction of an arrow $D_B$ parallel to a radial direction of the optical-pickup-adjustment optical disk 30.

Figure 2A:
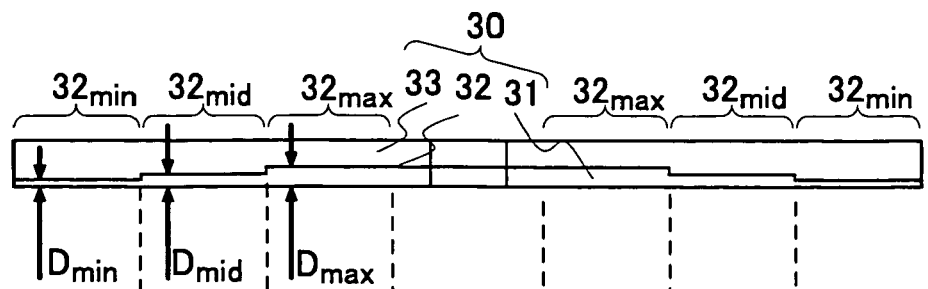
FIG. 2A is a schematic cross-sectional view showing structure of the optical-pickup-adjustment optical disk according to the first embodiment.
Figure 2B:
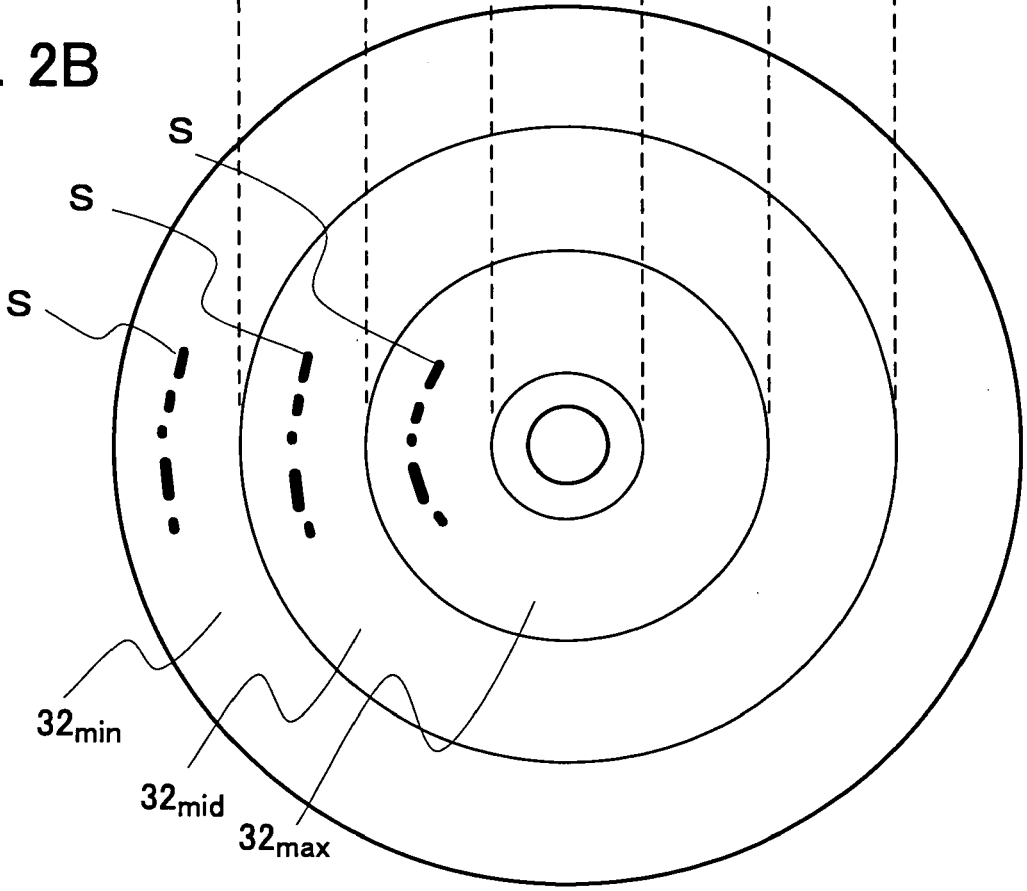
FIG. 2B is a schematic plan view of the optical-pickup-adjustment optical disk according to the first embodiment when viewed from underside in FIG. 2A.

FIG. 2A is a schematic cross-sectional view showing structure of the optical-pickup-adjustment optical disk according to the first embodiment, and FIG. 2B is a schematic plan view of the optical-pickup-adjustment optical disk according to the first embodiment when viewed from underside in FIG. 2A.

As shown in FIGS. 2A and 2B, the optical-pickup-adjustment optical disk 30 includes a transparent protective substrate 31, an information recording layer 32 formed on a side of an inner surface of the protective substrate 31, and a protective layer 33 covering the information recording layer 32. In the first embodiment, the information recording layer 32 includes an optical-pickup-adjustment maximum-depth information recording layer having a depth $D_{max}$ which is the same as that of the maximum-depth information recording layer prescribed by the optical disk standard; an optical-pickup-adjustment minimum-depth information recording layer $32_{min}$ having a depth $D_{min}$ which is the same as that of the minimum-depth information recording layer prescribed by the optical disk standard; and an optical-pickup-adjustment middle-depth information recording layer $32_{mid}$ having a depth $D_{mid}$ which is a middle of the depth $D_{max}$ of the maximum-depth information recording layer $32_{max}$ prescribed by the optical disk standard and the depth $D_{min}$ of the minimum-depth information recording layer $32_{min}$ prescribed by the optical disk standard. Further, a depth of an information recording layer is equivalent to a thickness of the protective substrate 31, namely, a distance from an outer surface of the protective substrate 31 to the information recording layer. Furthermore, each component of the optical-pickup-adjustment optical disk such as the information recording layers is formed in conformity with any of the various kinds of the optical disk (e.g., CD, DVD, HD-DVD, or Blu-ray disc) standards, and therefore formed by substantially the same structure and materials as the corresponding optical disk.

As shown in FIGS. 2A and 2B, the optical-pickup-adjustment maximum-depth information recording layer $32_{max}$, the optical-pickup-adjustment middle-depth information recording layer $32_{mid}$, and the optical-pickup-adjustment minimum-depth information recording layer $32_{min}$ are arranged in a radial direction from a side of a center of the optical-pickup-adjustment optical disk 30 toward outside. An optical-pickup-adjustment signal S (e.g., pits) used for adjusting an optical pickup device 10 are recorded in the optical-pickup-adjustment maximum-depth information recording layer $32_{max}$, the optical-pickup-adjustment middle-depth information recording layer $32_{mid}$, and the optical-pickup-adjustment minimum-depth information recording layer $32_{min}$. Further, although FIGS. 2A and 2B show three depths of the information recording layers, the optical-pickup-adjustment optical disk may have another information recording layer other than the above-mentioned three information recording layers having different depths. Furthermore, the arrangement of the information recording layers is not limited to an example shown in FIGS. 2A and 2B.

Next, a method of adjusting an optical pickup device 10 using the optical-pickup-adjustment optical disk 30 or a method of producing an optical pickup device using the method of adjusting an optical pickup device will be described. First, the optical pickup device 10 to be adjusted is connected to the adjustment device 20. Next, the optical-pickup-adjustment optical disk 30 is loaded in the adjustment device 20. A state after the loading is shown in FIG. 1.

Next, the optical-pickup-adjustment middle-depth information recording layer $32_{mid}$ of the optical-pickup-adjustment optical disk 30 is selected in accordance with the layer selection signal output from the layer selection signal generator 26, and then the spindle motor movement mechanism 27b moves the optical-pickup-adjustment optical disk 30 in accordance with a signal output from the spindle motor movement circuit 27a in such a way that the object lens 14 faces the optical-pickup-adjustment middle-depth information recording layer $32_{mid}$ of the optical-pickup-adjustment optical disk 30.

Next, the spindle motor 28 rotates the optical-pickup-adjustment optical disk 30.

Figure 3:
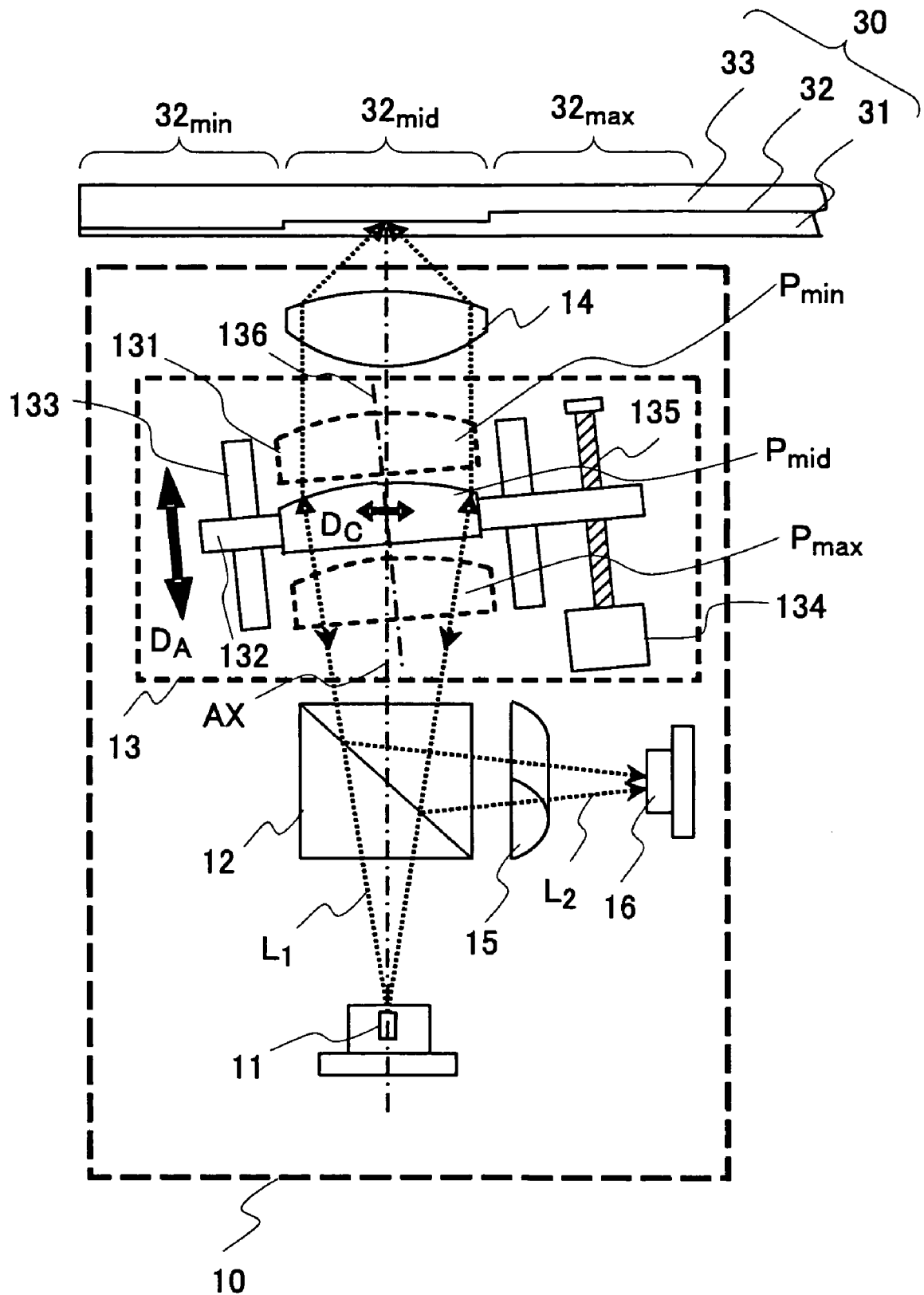
FIG. 3 is a diagram schematically showing a cross-sectional shape of the optical-pickup-adjustment optical disk according to the first embodiment of the present invention, and a plan view of the optical pickup device, to which the adjustment method using a middle-depth information recording layer of the optical-pickup-adjustment optical disk is applied.

Next, the optical pickup device 10 causes the motor 134 of the collimator lens optical system 13 to operate in accordance with an instruction output from the layer selection signal generator 26, thereby moving the collimator lens 131 in a direction of an optical axis to a position corresponding to a depth of the optical-pickup-adjustment middle-depth information recording layer $32_{mid}$, that is, the thickness $D_{mid}$ of the protective substrate 31 ($P_{mid}$ in FIG. 3 described below).

Next, the semiconductor laser 11 emits a laser beam $L_1$, and the light detector 16 receives the laser beam $L_2$ reflected from the middle-depth information recording layer $32_{mid}$ of the optical-pickup-adjustment optical disk 30. The detection optical system for the reflected laser beam $L_2$ adopts a focus detection method based on the known astigmatism scheme using the cylindrical lens 15. The light detector 16 outputs an electrical signal having intensity in accordance with the received laser beam $L_2$ to the reproduction signal detection circuit 21 and the control signal detection circuit 22. The reproduction signal detection circuit 21 and the control signal detection circuit 22 detect a control signal such as the reproduction signal and the focus error signal, the light detector adjustment circuit 24a calculates an optimum position of the light detector 16, which realizes an optimum positional relationship between the reflected laser beam $L_2$ and the light detector 16, and then the light detector adjustment mechanism 24b operates so as to move the light detector 16 to an optimum position.

Further, in addition to the adjustment of the position of the light detector 16, quality of the reproduction signal is adjusted by adjusting the optical aberration in order to obtain more improvement of quality of the reproduction signal as follows. The signal correction circuit 23 analyzes quality of the reproduction signal output from the reproduction signal detection circuit 21 to output a result of the analysis to the lens movement mechanism 25, and the lens movement mechanism 25 causes the collimator lens 131 to move in a direction of an arrow $D_A$ parallel to the movement axis 136 so as to obtain the highest quality of the reproduction signal. Furthermore, although FIG. 1 indicates a case where the movement axis 136 of the collimator lens 131 coincides with the optical axis AX of the object lens 14, there is a little deviation between them as shown in FIG. 3 described below. For this reason, the motor 134 of the collimator lens optical system 13 is driven in accordance with a signal output from the lens movement circuit 25, the screw shaft 135 rotates in accordance with operation of the motor 134, the lens holder 132 moves along the guide shaft 133 in a direction of an arrow $D_A$, and therefore the collimator lens 131 is adjusted so as to move the optimum position in view of aberration correction.

As has been described above, first of all, the position adjustment of the light detector 16 is performed using the optical-pickup-adjustment middle-depth information recording layer $32_{mid}$ of the optical-pickup-adjustment optical disk 30. Next, it is checked that the position adjustment of the light detector 16 can be performed using any information recording layer of the optical-pickup-adjustment optical disk 30 without any problems. For this purpose, quality of the control signal such as a reproduction signal and a focus error signal is checked using the optical-pickup-adjustment maximum-depth information recording layer $32_{max}$ and the optical-pickup-adjustment minimum-depth information recording layer $32_{min}$ of the optical-pickup-adjustment optical disk 30. Further, when the irradiation position of the laser beam is moved to the optical-pickup-adjustment maximum-depth information recording layer $32_{max}$ or the optical-pickup-adjustment minimum-depth information recording layer $32_{min}$ (a case shown in FIG. 5 or a case shown in FIG. 6 described below), the collimator lens 131 is moved in a direction of an arrow $D_A$ along the movement axis 136 in such a way that the highest quality of the reproduction signal is obtained for each of the optical-pickup-adjustment maximum-depth information recording layer $32_{max}$ and the optical-pickup-adjustment minimum-depth information recording layer $32_{min}$. For example, since the thickness of the protective substrate is large in a region of the optical-pickup-adjustment maximum-depth information recording layer $32_{max}$, when the maximum-depth information recording layer $32_{max}$ is used for position adjustment, the collimator lens 131 moves away from the object lens 14 (a case shown in FIG. 5 described below). In contrast to this, since the thickness of the protective substrate is small in a region of the optical-pickup-adjustment minimum-depth information recording layer $32_{min}$, when the optical-pickup-adjustment minimum-depth information recording layer $32_{min}$ is used for position adjustment, the collimator lens 131 moves toward the object lens 14 (a case shown in FIG. 6 described below).

Next, the description is made that quality of the detection signal of the light detector 16 can be improved by the method of adjusting an optical pickup device 10 including the below-described procedures with reference to FIG. 3 to FIG. 7.

FIG. 3 is a diagram schematically showing a plan view of the optical pickup device, to which the adjustment method using the optical-pickup-adjustment middle-depth information recording layer $32_{mid}$ of the optical-pickup-adjustment optical disk 30 is applied.

Although FIG. 3 does not show the adjustment device 20 shown in FIG. 1, in practical cases, the optical pickup device 10 is connected to the adjustment device 20 in a similar manner to the case shown in FIG. 1. FIG. 3 shows a case where the collimator lens optical system 13 of the optical pickup device 10 is inclined with respect to an ideal arrangement. In practical cases, it is impossible to arrange the movement axis 136 (a direction of an arrow $D_A$) of the collimator lens 131 which is moved by the motor 134 of the collimator lens optical system 13 to completely coincide with the optical axis AX without error, and there is inevitably slight inclination or deviation of parallelism between the movement axis 136 and the optical axis AX. Further, such inclination or deviation of parallelism is influenced by the play between the lens holder 132 and the guide shaft 133. This inclination of the movement axis 136 of the collimator lens 131 with respect to the optical axis AX leads to variation of a direction of an arrow $D_C$ between a position $P_{max}$ which is a position of the collimator lens 131 suitable for the depth $D_{max}$ of the optical-pickup-adjustment maximum-depth information recording layer $32_{max}$ (the thickness of the protective substrate 31 of the optical-pickup-adjustment maximum-depth information recording layer $32_{max}$) and a position $P_{min}$ which is a position of the collimator lens 131 suitable for the depth $D_{min}$ of the optical-pickup-adjustment minimum-depth information recording layer $32_{min}$ (the thickness of the protective substrate 31 of the optical-pickup-adjustment minimum-depth information recording layer $32_{min}$).

Figure 4A:
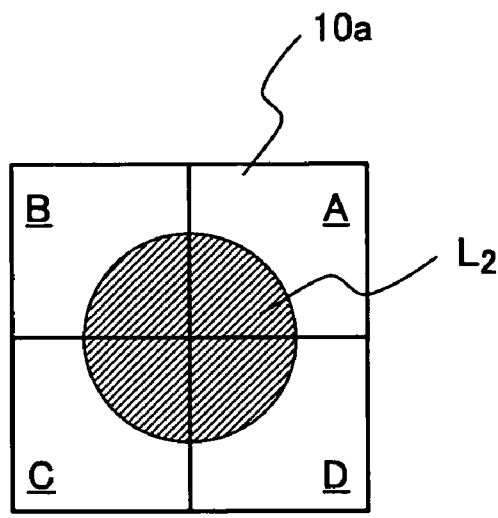
FIG. 4A shows a shape of a photosensitive surface of a light detector of the optical pickup device according to the first embodiment and an irradiation position of a laser beam.
Figure 4B:
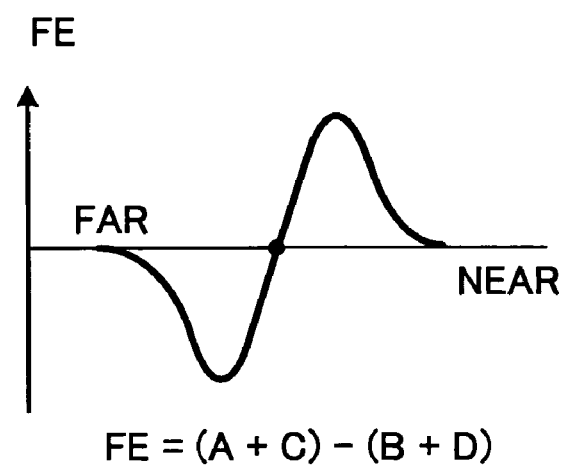
FIG. 4B shows a focus error signal characteristic in the case of FIG. 4A.
Figure 4C:
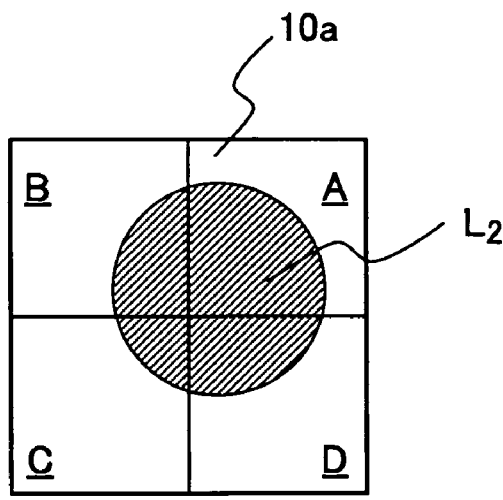
FIG. 4C shows the shape of the photosensitive surface of the light detector of the optical pickup device according to the first embodiment and an irradiation position of a laser beam.
Figure 4D:
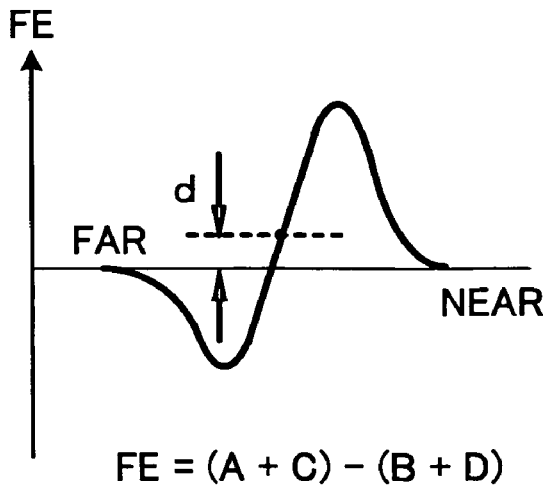
FIG. 4D shows a focus error signal characteristic in the case of FIG. 4C.

FIG. 4A shows a shape of a photosensitive surface 10a of the light detector of the optical pickup device according to the first embodiment and an irradiation position of a laser beam, FIG. 4B shows a focus error signal characteristic in the case of FIG. 4A, FIG. 4C shows the shape of the photosensitive surface 10a of the light detector of the optical pickup device according to the first embodiment and an irradiation position of a laser beam; and FIG. 4D shows a focus error signal characteristic in the case of FIG. 4C. FIGS. 4A and 4B show a case where the position adjustment of the light detector 16 is performed when the movement axis 136 of the collimator lens 131 coincides with the optical axis AX. FIGS. 4C and 4D show a case where the collimator lens 131 is moved from a position of FIG. 4A so as to be suitable for a thickness of another protective substrate while accompanying the variation of a direction of an arrow $D_C$ perpendicular to the optical axis AX.

As shown in FIGS. 4A and 4C, the photosensitive surface 10a of the light detector 16 is divided into four square photosensitive areas (a two-by-two matrix) so as to make it possible to perform the focus error detection based on the astigmatism scheme. Although the divided four photosensitive areas are assigned 'A' to 'D' respectively, intensities of the detection signals output from the divided four photosensitive areas are also indicated by A to D respectively in the following description. As shown in FIG. 4A and 4B, when the light detector 16 is adjusted under the condition that the collimator lens 131 is properly positioned on the optical axis AX, the light detector 16 can be adjusted in such a way that the laser beam $L_2$ impinges on the photosensitive areas 'A' to 'D' of the light detector 16 equally. In such a situation, a focus error signal FE of the photosensitive areas 'A' to 'D' (intensities of the detection signals output from the photosensitive areas are also indicated by A to D respectively) is calculated by the following equation:

$$FE=(A+C)-(B+D).$$

It is possible not to cause the offset component of the focus error signal based on the astigmatism scheme using the above equation to be generated.

However, when the collimator lens 131 does not move properly along the optical axis AX, for example, as shown in FIGS. 4C and 4D, the irradiation position of the laser beam $L_2$ is shifted in a direction toward any of the photosensitive areas (e.g., in a direction toward the photosensitive area 'A'). As a result, the focus error signal includes an offset component 'd', a focus error corresponding to the offset component 'd' occurs, and when amount of the focus error becomes large, the focus error interferes with the recording or reproducing of information.

Figure 5:
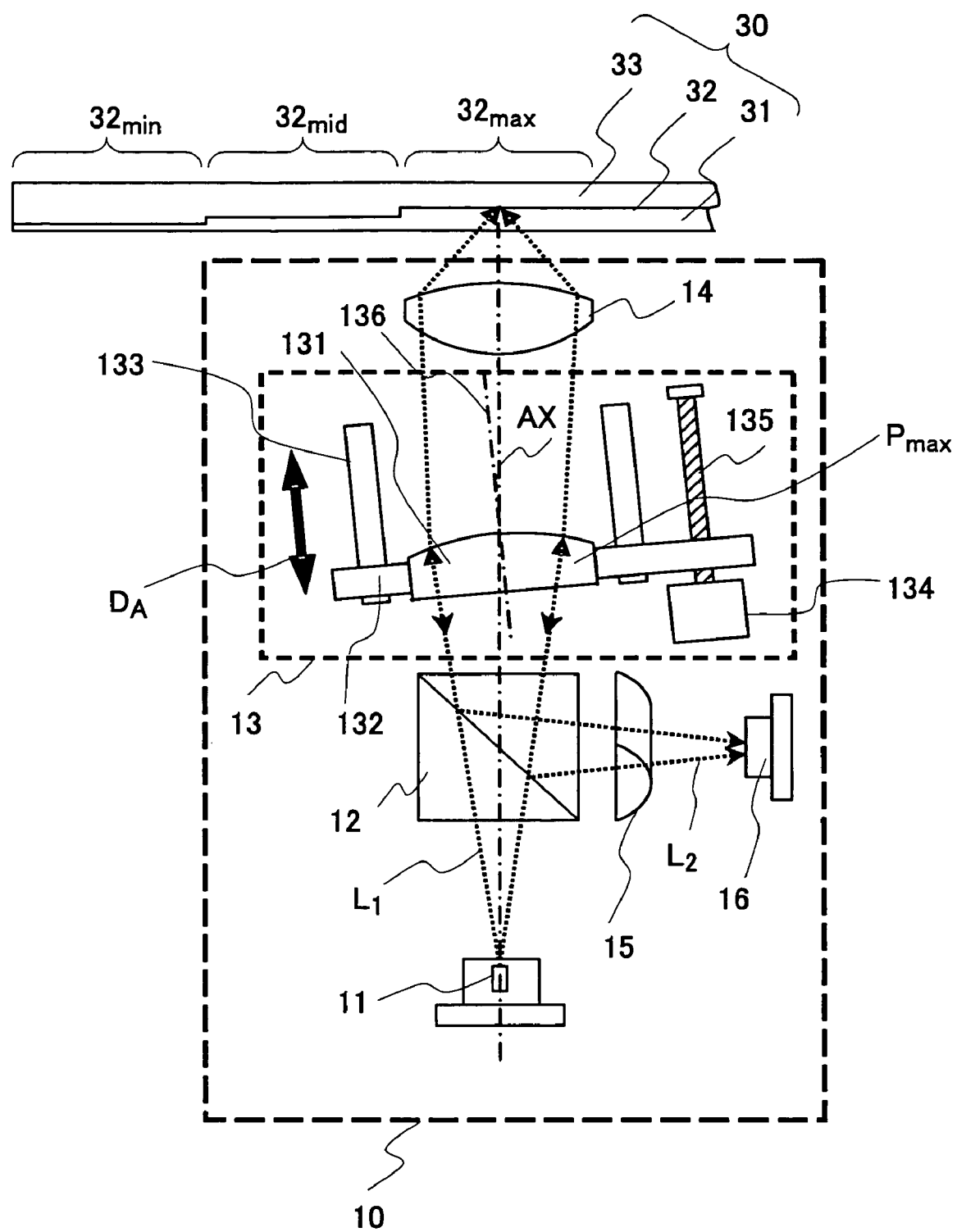
FIG. 5 is a diagram schematically showing a cross-sectional shape of the optical-pickup-adjustment optical disk according to the first embodiment of the present invention, and a plan view of the optical pickup device, to which a test using a maximum-depth information recording layer of the optical-pickup-adjustment optical disk is applied.

FIG. 5 is a diagram showing a cross-sectional shape of the optical-pickup-adjustment optical disk 30 and a plan view showing a position of the collimator lens 131 in the first embodiment of the present invention, when the adjustment device 20 selects the optical-pickup-adjustment maximum-depth information recording layer $32_{max}$ formed on the protective substrate having a thickness $D_{max}$, which corresponds to the deepest layer of an optical disk having two layers prescribed by the optical disk standard. Further, FIG. 6 is a diagram showing a cross-sectional shape of the optical-pickup-adjustment optical disk 30 and a plan view showing a position of the collimator lens 131 in the first embodiment of the present invention, when the adjustment device 20 selects the optical-pickup-adjustment minimum-depth information recording layer $32_{min}$ formed on the protective substrate having a thickness $D_{min}$, which corresponds to the shallowest layer of an optical disk having two layers prescribed by the optical disk standard.

Figure 6:
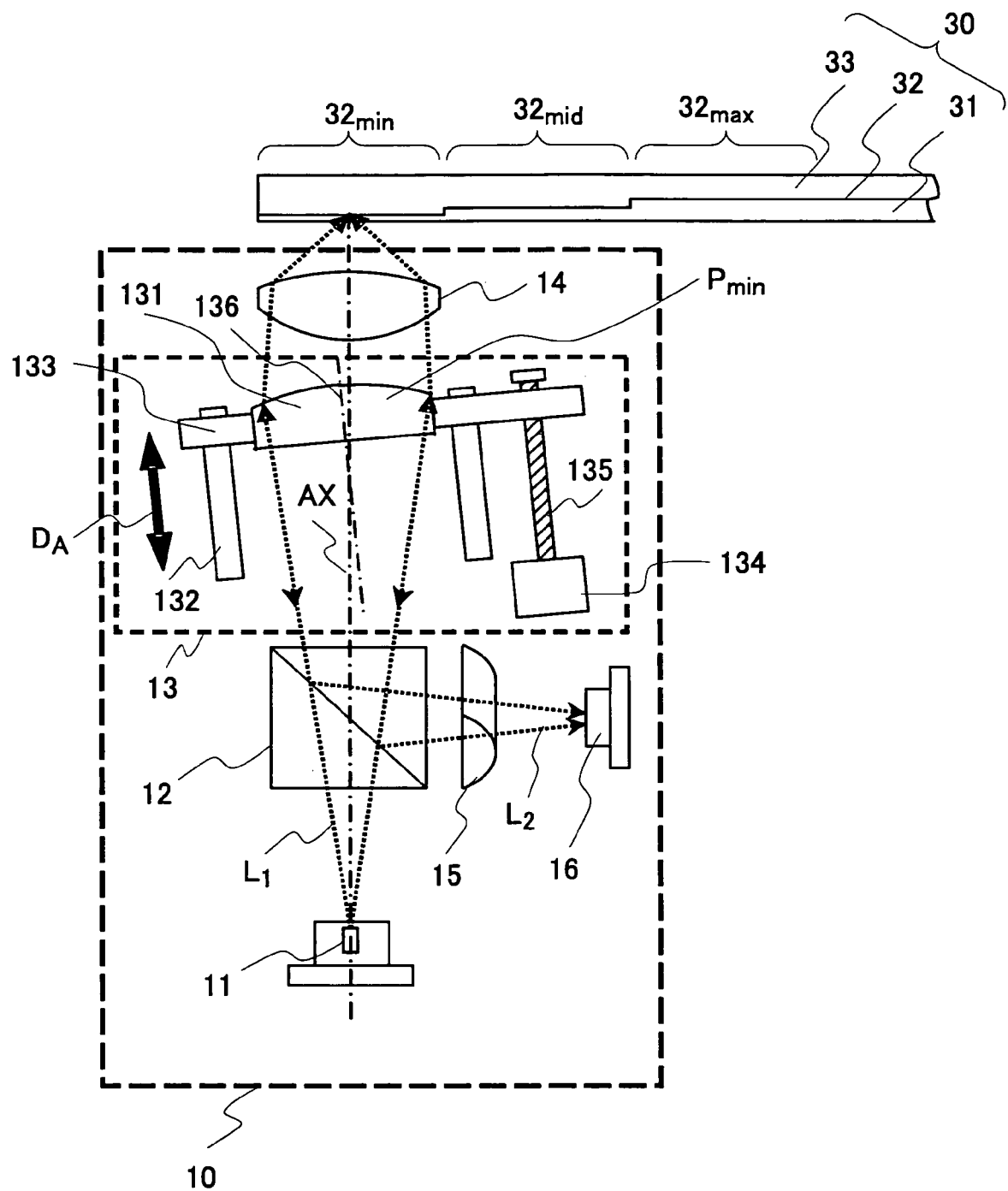
FIG. 6 is a diagram schematically showing a cross-sectional shape of the optical-pickup-adjustment optical disk according to the first embodiment of the present invention, and a plan view of the optical pickup device, to which a test using a minimum-depth information recording layer of the optical-pickup-adjustment optical disk is applied.

The collimator lens 131 is moved to the position $P_{max}$ in FIG. 5, and is moved to the position $P_{min}$ in FIG. 6. As shown in FIG. 3, the position $P_{max}$ and the position $P_{min}$ are positioned on opposite sides with respect to the position $P_{mid}$ of the collimator lens 131 when the optical-pickup-adjustment middle-depth information recording layer $32_{mid}$ is selected. Therefore, in the case where the movement axis 136 of the collimator lens 131 is inclined with respect of the optical axis AX of the object lens 14, an amount of displacement of the collimator lens 131 in a direction perpendicular to the optical axis AX resulting from the movement of the collimator lens 131 from the position $P_{mid}$ to the position $P_{max}$ or from the position $P_{mid}$ to the position $P_{min}$ is approximately half of an amount of displacement of the collimator lens 131 in a direction perpendicular to the optical axis AX resulting from the movement of the collimator lens 131 from the position $P_{max}$ to the position $P_{min}$.

Figure 7:
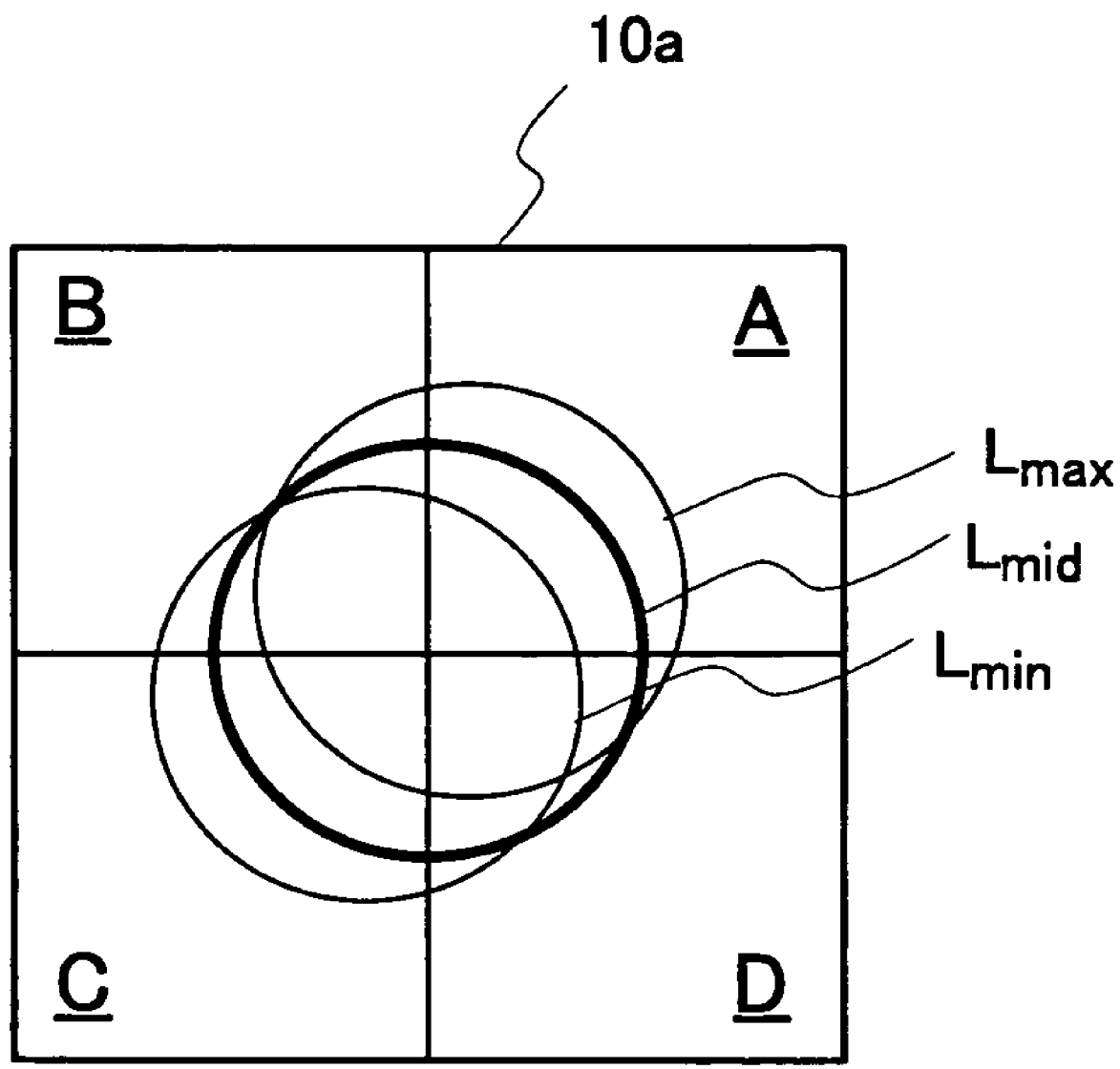
FIG. 7 is a diagram showing a shape of the photosensitive surface of the light detector of the optical pickup device according to the first embodiment and irradiation positions of a laser beam when a collimator lens moves.

FIG. 7 is a diagram showing a shape of the photosensitive surface 10a of the light detector 10 of the optical pickup device according to the first embodiment and irradiation positions of a laser beam $L_1$ when the collimator lens moves. In FIG. 7, $L_{max}$ denotes a position of distribution of the laser beam $L_1$ when the light detector 16 is adjusted under the condition that the collimator lens 131 is at the position $P_{max}$. Further, $L_{max}$ and $L_{min}$ denote positions of distribution of the laser beam $L_1$ when the light detector 16 is adjusted under the condition that the collimator lens 131 is at the position $P_{max}$ and the position $P_{min}$ respectively. Since directions of displacement of distribution of the laser beam $L_1$ under the condition that the collimator lens 131 is at the position $P_{max}$ or position $P_{min}$, are opposite to each other, an amount of displacement becomes approximately half for the above-described reason.

The above-described method of adjusting an optical pickup device of the first embodiment will be described while comparing it with the conventional method of adjusting. Since the conventional optical-pickup-adjustment optical disk includes only an information recording layer or layers having a depth or depths prescribed by the optical disk standard, the position of the light detector is adjusted after the selection of any of the information recording layers having depths prescribed with the optical disk standard. Therefore, when the collimator lens 131 is moved after the selection of the other information recording layer having a different depth that was not selected in the previous adjustment, there is a problem that the irradiation position of the laser beam $L_2$ impinging on the light detector 16 is largely deviated from a center of the photosensitive surface 10a, as shown in FIGS. 4C and 4D. However, in the method of adjusting an optical pickup device according to the first embodiment of the present invention, since the optical-pickup-adjustment optical disk includes an optical-pickup-adjustment middle-depth information recording layer $32_{mid}$ having a middle depth of the maximum depth $D_{max}$ of the optical-pickup-adjustment maximum-depth information recording layer $32_{max}$ and the minimum depth $D_{min}$ of the optical-pickup-adjustment minimum depth information recording layer $32_{min}$ in addition to the optical-pickup-adjustment maximum-depth information recording layer $32_{max}$ and the optical-pickup-adjustment minimum depth information recording layer $32_{min}$ and the position of the collimator lens is adjusted using the optical-pickup-adjustment middle-depth information recording layer $32_{mid}$, a deviation of the irradiation position of the laser beam $L_1$ impinging on the light detector 16, from a center the photosensitive surface can be reduced to a half level.

Figure 8:
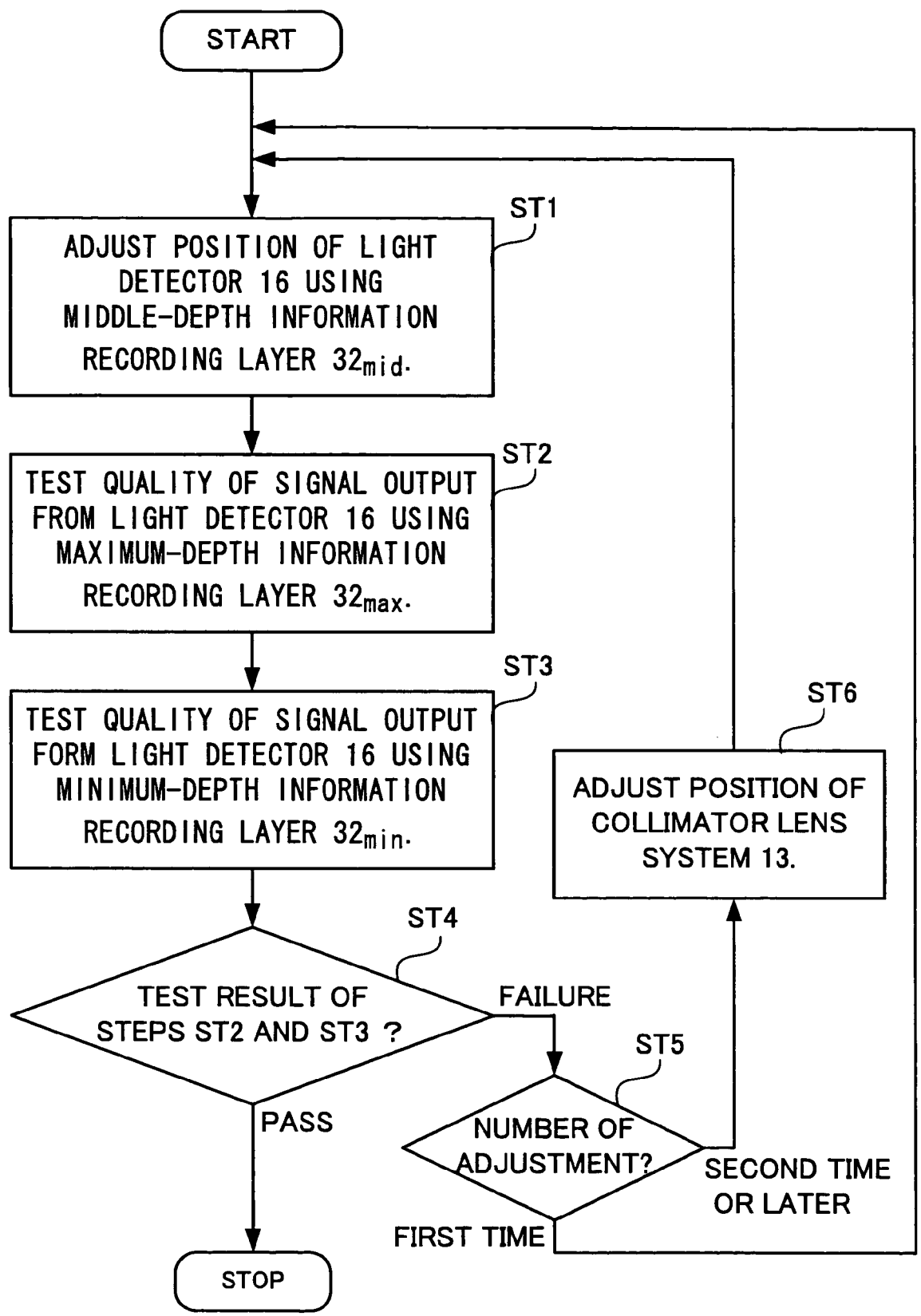
FIG. 8 is a flowchart schematically showing the method of adjusting an optical pickup device according to the first embodiment.

Further, the method of adjusting an optical pickup device and the method of producing an optical pickup device using the method of adjusting an optical pickup device will be described with reference to FIG. 8. FIG. 8 is a flowchart showing the method of adjusting an optical pickup device according to the first embodiment of the present invention. First, in the first step (step ST1), position of the light detector 16 is adjusted using the optical-pickup-adjustment middle-depth information recording layer $32_{mid}$ having a middle depth $D_{mid}$ of a plurality of depths (a plurality of thicknesses of the protective substrate) prescribed by the optical disk standard.

In the next step ST2, the adjustment device 20 moves the optical-pickup-adjustment optical disk 30 in a radial direction, for example, quality of a signal output from the light detector 16 is tested using the optical-pickup-adjustment maximum-depth information recording layer $32_{max}$ prescribed by the optical disk standard.

In the next step ST3, the adjustment device 20 moves the optical-pickup-adjustment optical disk 30 in a radial direction, for example, quality of a signal output from the light detector 16 is tested using the optical-pickup-adjustment minimum-depth information recording layer $32_{mid}$ prescribed by the optical disk standard.

In the next step ST4, pass/fail decisions of quality of the signals output from the light detector 16 in steps ST2 and ST3 are performed, if both tests are passed, the adjustment is terminated. On the other hand, any of the tests is not passed, for example, processing advances to step ST1 and the readjustment of the light detector 16 is started. When any of the tests is not passed after the same adjustment step is repeated a predetermined times, for example, twice or more, it seems that there is a problem of positioning accuracy of the collimator lens optical system 13 and a deviation of the movement axis 136 of the collimator lens 131 from the optical axis AX is originally large. Accordingly, in such case, the adjustment of the light detector 16 according to the present invention should be performed after performing the initial positioning of the components for improving the original positioning accuracy of the collimator lens optical system 13. Therefore, in step ST5, number of the adjustment steps is checked. If the test in the first adjustment is failed, position of the light detector 16 is readjusted. If the test in the second adjustment is failed, positions of components of the collimator lens optical system 13 are readjusted and then readjustment of the position of the light detector 16 is started.

A case where the optical disk standard describes an optical disk having two information recording layers, in or from which information is recorded or reproduced through the same protective substrate has been described in the above description. However, if the optical disk standard describes an optical disk having three or more information recording layers, the optical-pickup-adjustment optical disk should be formed so as to includes an optical-pickup-adjustment maximum-depth information recording layer having the deepest depth, an optical-pickup-adjustment minimum-depth information recording layer having the shallowest depth, and an optical-pickup-adjustment middle-depth information recording layer having a middle depth of the deepest depth and the shallowest depth.

Further, although a case where the spindle motor 28 supporting the optical disk is moved in a radial direction of the optical disk has been described in the above description, it is possible to adopt a structure for moving the optical pickup device 10 in a radial direction of the optical disk.

Furthermore, although a case where the optical-pickup-adjustment maximum-depth information recording layer $32_{max}$, the optical-pickup-adjustment middle-depth information recording layer $32_{mid}$, and the optical-pickup-adjustment minimum-depth information recording layer $32_{min}$ are arranged in an order from a side of a center of the optical disk toward outside has been described in the above description, arrangement of the information recording layers is not limited to the above-mentioned example.

Moreover, although a case where the collimator lens 131 is moved in a direction of an optical axis in order to correct spherical aberration in the optical pickup device to be adjusted has been described in the above description, it is possible to adopt a method in which a beam expander lens (not shown) having a function of expanding a width of the laser beam flux is added in addition to the collimator lens 131, and the beam expander lens is moved in order to correct the spherical aberration.

Additionally, although a case where the motor 134 rotates the screw shaft 135 to move the collimator lens in the optical pickup device to be adjusted has been described in the above description, for example, it is possible to adopt a mechanism (not shown) including a drive means having a voice coil motor that can move the collimator lens 131 in a direction of an optical axis.

Further, although a case where the astigmatism scheme is adopted as a focus error detection scheme in the optical pickup device to be adjusted has been described in the above description, the focus error detection scheme is not limited to the astigmatism scheme.

Second Embodiment

Figure 9:
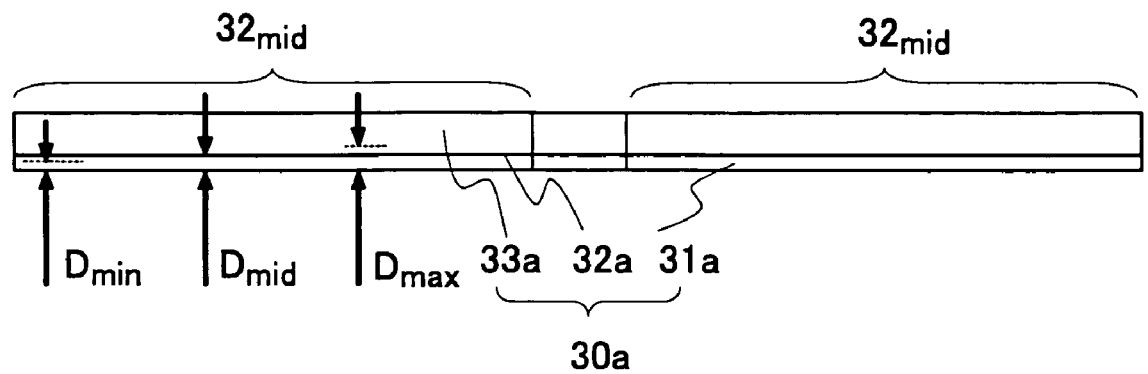
FIG. 9 is a cross-sectional view schematically showing an optical-pickup-adjustment optical disk according to the second embodiment of the present invention.

FIG. 9 is a cross-sectional view schematically showing structure of an optical-pickup-adjustment optical disk 30a according to the second embodiment of the present invention.

As shown in FIG. 9, the optical-pickup-adjustment optical disk 30a according to the second embodiment includes a transparent protective substrate 31a, an information recording layer 32a formed on an inside surface of the protective substrate 31a, and a protective layer 33a covering the information recording layer 32a. In the second embodiment, the information recording layer 32a includes an optical-pickup-adjustment middle-depth information recording layer $32_{mid}$ which is formed at a middle depth $D_{mid}$ of a depth $D_{max}$ of the maximum-depth information recording layer and a depth $D_{min}$ of the minimum-depth information recording layer prescribed by the optical disk standard. As shown in FIG. 9, the optical-pickup-adjustment optical disk 30a according to the second embodiment is different from the optical-pickup-adjustment optical disk 30 according to the first embodiment in a point that it does not include an optical-pickup-adjustment maximum-depth information recording layer $32_{max}$ and an optical-pickup-adjustment minimum-depth information recording layer $32_{min}$, which correspond to a maximum-depth information recording layer and a minimum-depth information recording defined by the optical disk standard.

The optical-pickup-adjustment optical disk 30a according to the second embodiment, a method of adjusting an optical pickup device using it, and a method of producing an optical pickup device using the method of adjusting an optical pickup device are useful in a case where it is assured that the position of the light detector can be adequately set only by adjusting the light detector using the middle-depth information recording layer $32_{mid}$. By using the optical-pickup-adjustment optical disk 30a, a verification test using an optical disk including an information recording layer defined by the optical disk standard can be omitted.

Further, except for the above-described respects, the second embodiment is substantially the same as the first embodiment.

Third Embodiment

Figure 10:
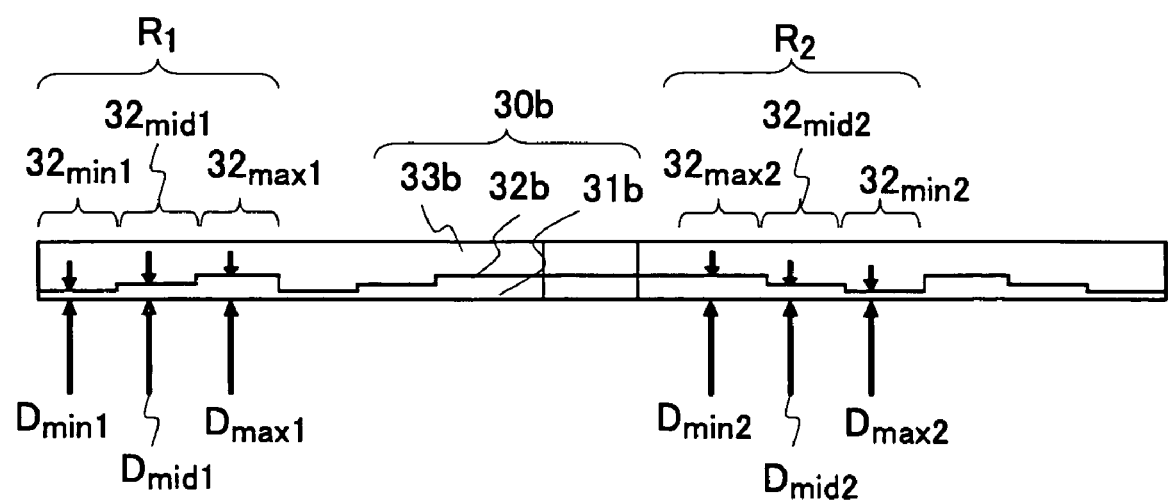
FIG. 10 is a cross-sectional view schematically showing an optical-pickup-adjustment optical disk according to the third embodiment of the present invention.

FIG. 10 is a cross-sectional view schematically showing structure of an optical-pickup-adjustment optical disk 30b according to the third embodiment of the present invention.

As shown in FIG. 10, the optical-pickup-adjustment optical disk 30b according to the third embodiment includes a transparent protective substrate 31b, an information recording layer 32b formed on an inside surface of the protective substrate 31b, and a protective layer 33b covering the information recording layer 32b. The optical-pickup-adjustment optical disk 30b according to the third embodiment is divided into a region $R_1$ corresponding to the first optical disk standard and disposed on an outer side region in a radial direction of the optical disk and a region $R_2$ corresponding to the second optical disk standard and disposed on a center side region in a radial direction of the optical disk. The first optical disk standard is, for example, in conformity with the Blu-ray disc standard as one of the blue DVD standard, and the second optical disk standard is, for example, in conformity with red DVD standard. As has been said, the first optical disk standard and the second optical disk standard may be standards prescribing different optical conditions in a wavelength of semiconductor laser and/or a numerical aperture of the object lens. Further, number of the regions corresponding to the optical disk standards and provided in the optical-pickup-adjustment optical disk 30b may be three or more. Furthermore, the region $R_1$ corresponding to the first optical disk standard or the region $R_2$ corresponding to the second optical disk standard may have substantially the same structure as that of the above-mentioned second embodiment.

As shown in FIG. 10, the optical-pickup-adjustment optical disk 30b includes an optical-pickup-adjustment maximum-depth information recording layer $32_{max1}$, an optical-pickup-adjustment minimum-depth information recording layer $32_{min1}$, and an optical-pickup-adjustment middle-depth information recording layer $32_{mid1}$. The optical-pickup-adjustment maximum-depth information recording layer $32_{max1}$ is formed within the region $R_1$ corresponding to the first optical disk standard so as to have the same depth $D_{max1}$ as that of the maximum-depth information recording layer prescribed by the first optical disk standard. The optical-pickup-adjustment minimum-depth information recording layer $32_{min1}$ is formed within the region $R_1$ corresponding to the first optical disk standard so as to have the same depth $D_{min1}$ as that of the minimum-depth information recording layer prescribed by the first optical disk standard. The optical-pickup-adjustment middle-depth information recording layer $32_{mid1}$ is formed within the region $R_1$ corresponding to the first optical disk standard so as to have a depth $D_{mid1}$ that is a middle depth of the depth $D_{max1}$ of the optical-pickup-adjustment maximum-depth information recording layer $32_{max1}$ and the depth $D_{min1}$ of the optical-pickup-adjustment minimum-depth information recording layer $32_{min1}$.

Further, as shown in FIG. 10, the optical-pickup-adjustment optical disk 30b includes an optical-pickup-adjustment maximum-depth information recording layer $32_{max2}$, an optical-pickup-adjustment minimum-depth information recording layer $32_{min2}$, and an optical-pickup-adjustment middle-depth information recording layer $32_{mid2}$. The optical-pickup-adjustment maximum-depth information recording layer $32_{max2}$ is formed within the region $R_2$ corresponding to the second optical disk standard so as to have the same depth $D_{max2}$ as that of the maximum-depth information recording layer defined by the second optical disk standard. The minimum-depth information recording layer $32_{min2}$ is formed within the region $R_2$ corresponding to the second optical disk standard so as to have the same depth $D_{min2}$ as that of the minimum-depth information recording layer defined by the second optical disk standard. The optical-pickup-adjustment middle-depth information recording layer $32_{mid2}$ is formed within the region $R_2$ corresponding to the second optical disk standard so as to have a depth $D_{mid2}$ that is a middle depth of the depth $D_{max2}$ of the optical-pickup-adjustment maximum-depth information recording layer $32_{max1}$ and the depth $D_{min2}$ of the optical-pickup-adjustment minimum-depth information recording layer $32_{min2}$.

By using to the optical-pickup-adjustment optical disk 30b according to the third embodiment, a method of adjusting an optical pickup device using it, or a method of producing an optical pickup device using the method of adjusting an optical pickup device, in addition to the advantages of the first embodiment, an advantage can be obtained that various adjustment using a plurality of optical disk standards can be performed without changing the optical-pickup-adjustment optical disk.

Further, except for the above-described respects, the second embodiment is substantially the same as the first or second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An optical-pickup-adjustment optical disk used for adjusting an optical pickup device, wherein:
   the optical pickup device irradiates an optical disk comprising a plurality of information recording layers formed on a side of an inside surface of a transparent protective substrate with a laser beam, thereby applying the laser beam through the transparent protective substrate to any of the plurality of information recording layers to detect the laser beam reflected from the information recording layer, to which the laser beam is applied, and
   an optical disk, in or from which information is recorded or reproduced by the optical pickup device, is prescribed by an optical disk standard, which prescribes a maximum-depth information recording layer which is a layer having a maximum depth from an outer surface of the protective substrate, and a minimum-depth information recording layer which is a layer having a minimum depth, which is shallower than the maximum depth, from the outer surface of the protective substrate;
   the optical-pickup-adjustment optical disk comprising:
   a transparent protective substrate; and
   an optical-pickup-adjustment middle-depth information recording layer formed on a side of an inside surface of the transparent protective substrate, the optical-pickup-adjustment middle-depth information recording layer being formed to have a middle depth which is a center of the maximum depth of the maximum-depth information recording layer prescribed by the optical disk standard and the minimum depth of the minimum-depth information recording layer prescribed by the optical disk standard.

2. The optical-pickup-adjustment optical disk according to claim 1, further comprising:
   an optical-pickup-adjustment maximum-depth information recording layer having a depth, which is the same as the maximum depth of the maximum-depth information recording layer prescribed by the optical disk standard; and
   an optical-pickup-adjustment minimum-depth information recording layer having a depth, which is the same as the minimum depth of the minimum-depth information recording layer prescribed by the optical disk standard;
   wherein the optical-pickup-adjustment optical disk is divided into a plurality of regions including a region of the optical-pickup-adjustment maximum-depth information recording layer, a region of the optical-pickup-adjustment middle-depth information recording layer, and a region of the optical-pickup-adjustment minimum-depth information recording layer, and the plurality of regions are arranged in a radial direction of the optical-pickup-adjustment optical disk respectively.

3. The optical-pickup-adjustment optical disk according to claim 1, wherein the plurality of information recording layers described by the optical disk standard is two information recording layers.

4. The optical-pickup-adjustment optical disk according to claim 1, wherein the plurality of information recording layers described by the optical disk standard is three or more information recording layers.

5. The optical-pickup-adjustment optical disk according to claim 1, further comprising:
   another optical-pickup-adjustment middle-depth information recording layer formed on the side of the inside surface of the transparent protective substrate, said another optical-pickup-adjustment middle-depth information recording layer being formed to have another middle depth which is a center of another maximum depth of another maximum-depth information recording layer prescribed by another optical disk standard and another minimum depth of another minimum-depth information recording layer prescribed by said another optical disk standard.

6. The optical-pickup-adjustment optical disk according to claim 5, wherein a wavelength of the laser beam and/or numerical aperture of an object lens described by the optical disk standard are different from another wavelength of the laser beam and/or another numerical aperture of an object lens described by said another optical disk standard.

7. A method of adjusting an optical pickup device using
   an adjustment device including a disk drive means for rotating an optical disk, and a light detector adjustment means for adjusting a position of a light detector of the optical pickup device on the basis of a detection signal output from the light detector, and
   the optical-pickup-adjustment optical disk of claim 1 loaded on the adjustment device;
   the method comprising the steps of:
   rotating the optical-pickup-adjustment optical disk, by the disk drive means of the adjustment device;
   irradiating the optical-pickup-adjustment middle-depth information recording layer of the optical-pickup-adjustment optical disk through the protective substrate with a laser beam, and detecting the laser beam reflected from the optical-pickup-adjustment middle-depth information recording layer; and
   adjusting the position of the light detector of the optical pickup device on the basis of the detection result of the reflected laser beam.

8. A method of adjusting an optical pickup device using
   an adjustment device including a disk drive means for rotating an optical disk, a movement means for changing a relative position of the disk drive means to the optical disk, and a light detector adjustment means for adjusting a position of a light detector of the optical pickup device on the basis of a detection signal output from the light detector, and the optical-pickup-adjustment optical disk of claim 2 loaded on the adjustment device;

the method comprising the steps of:

rotating the optical-pickup-adjustment optical disk, by the disk drive means of the adjustment device;

changing the relative position between the optical pickup device and the optical-pickup-adjustment optical disk, by the movement means;

irradiating the optical-pickup-adjustment middle-depth information recording layer of the optical-pickup-adjustment optical disk through the protective substrate with a laser beam, and detecting the laser beam reflected from the optical-pickup-adjustment middle-depth information recording layer;

adjusting the position of the light detector of the optical pickup device on the basis of the detection result of the laser beam reflected from the optical-pickup-adjustment middle-depth information recording layer, by the light detector adjustment means of the adjustment device changing a relative position between the optical pickup device and the optical-pickup-adjustment optical disk, by the movement means of the adjustment device, irradiating the optical-pickup-adjustment maximum-depth information recording layer of the optical-pickup-adjustment optical disk through the protective substrate with a laser beam, and detecting the laser beam reflected from the optical-pickup-adjustment maximum-depth information recording layer;

changing a relative position between the optical pickup device and the optical-pickup-adjustment optical disk, by the movement means of the adjustment device, irradiating the optical-pickup-adjustment minimum-depth information recording layer of the optical-pickup-adjustment optical disk through the protective substrate with a laser beam, and detecting the laser beam reflected from the optical-pickup-adjustment minimum-depth information recording layer; and judging quality of a signal, by the adjustment device, on the basis of a detection result of the laser beam reflected from the optical-pickup-adjustment maximum-depth information recording layer and another detection result of the laser beam reflected from the optical-pickup-adjustment minimum-depth information recording layer.

9. A method of producing an optical pickup device using the method of adjusting an optical pickup device of claim 7.

10. A method of producing an optical pickup device using the method of adjusting an optical pickup device of claim 8.

* * * * *